H. M. Gilbert,
Coffee Roaster.

No. 107,771.        Patented Sep. 27, 1870.

Witnesses:
R. Edes J. Eils
F. Jones

Inventor:
H. M. Gilbert
By D. E. Somes & Co.
His Attorneys

United States Patent Office.

HARLOW M. GILBERT, OF ADA, OHIO.

Letters Patent No. 107,771, dated September 27, 1870.

IMPROVEMENT IN COFFEE-ROASTERS.

The Schedule referred to in these Letters Patent and making part of the same.

*To all whom it may concern:*

Be it known that I, HARLOW M. GILBERT, of Ada, in the county of Hardin and in the State of Ohio, have invented a new and useful Improvement in Coffee-Roasters; and I do hereby declare that the following is a full, clear, and exact description thereof, reference being had to the annexed drawing making part of this specification, in which—

The same letters are used in all the figures in the designation of identical parts.

This invention relates to devices for roasting coffee; and

It consists in combining with an ordinary skillet or frying-pan a conical cap, containing an agitator, which is to be placed upon such a skillet when coffee is to be browned or roasted therein, for the purposes of preventing the escape of fumes rising from such coffee, and retaining the "aroma" therein.

To enable those skilled in the art to make and use my invention, I will proceed to describe its construction and operation.

A represents a skillet, having a handle, A', by which to manipulate it. Its rim is formed with a shoulder and annular vertical flange, $a$, which embraces the lower end of the conical cap B when the latter is placed upon it, such cap being provided with a collar, $b$, which rests upon the upper edge of the flange $a$ of the pan.

Figure 1:
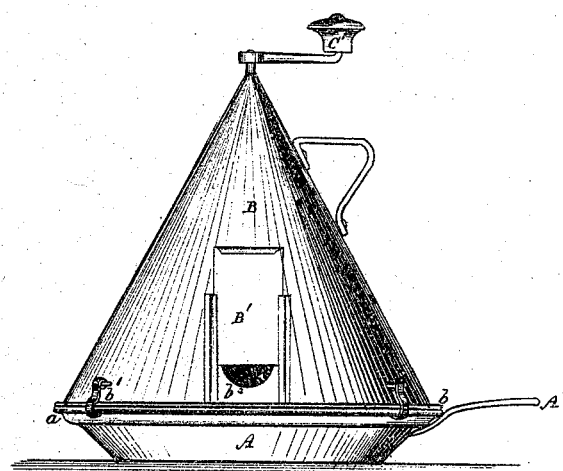
Figure 1 is an elevation.
Figure 2:
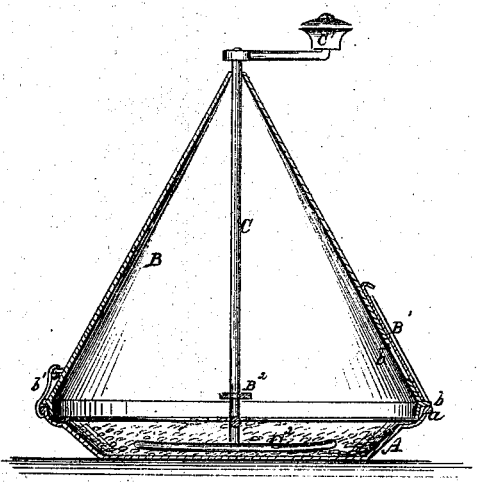
Figure 2 is an axial vertical section.
Figure 3:
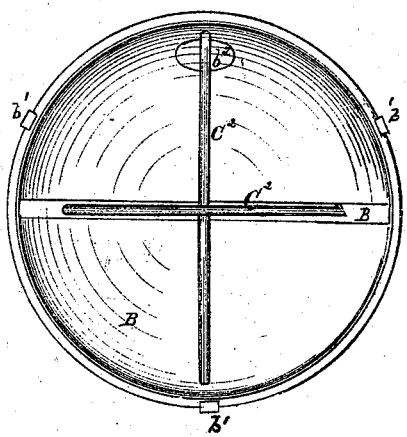
Figure 3 is a bottom view of the conical top.

The cap is held down on the pan by hooks $b^1$, as shown in figs. 1 and 2.

In the cap an opening is made at $b^2$, through which the coffee may be inspected or introduced into the pan, said opening being closed by a slide, $B^1$.

C represents a vertical shaft, which has its bearings in an aperture in the apex of the conical cap, and a cross-bar, $B^2$, stretched diametrically across the lower end of the same.

The upper end of the shaft projects through the cap, and is provided there with a crank, $C^1$, by which to turn it; and near its lower end, which may rest upon the bottom of the skillet, two arms, $C^2 C^2$, are secured to it at right angles to each other, forming an agitator by which the coffee is constantly stirred while being roasted, to prevent its burning.

What I claim as my invention, and desire to secure by Letters Patent, is—

The conical top B, having door $B^1$, agitator C $C^1$ $C^2$, collar $b$, and hooks $b^1$, in combination with the skillet A, having the flange $a$, all constructed and arranged substantially as described.

H. M. GILBERT.

Witnesses:
P. W. STUMM,
L. F. STUMM.